No. 707,769. Patented Aug. 26, 1902.
G. FERRARI.
CLUTCH MECHANISM.
(Application filed May 12, 1902.)
(No Model.)

Witnesses:
Wilhelm Vogt
Thomas M. Smith

Inventor:
Guido Ferrari
By J. Walter Douglas
Attorneys

UNITED STATES PATENT OFFICE.

GUIDO FERRARI, OF PHILADELPHIA, PENNSYLVANIA.

CLUTCH MECHANISM.

SPECIFICATION forming part of Letters Patent No. 707,769, dated August 26, 1902.

Application filed May 12, 1902. Serial No. 106,869. (No model.)

*To all whom it may concern:*

Be it known that I, GUIDO FERRARI, a citizen of the United States, residing at the city of Philadelphia, in the county of Philadelphia and State of Pennsylvania, have invented certain new and useful Improvements in Clutch Mechanism, of which the following is a specification.

My invention has relation to a clutch mechanism for cigarette and other machines adapted to prevent retrograde movement of the operating parts of such machines, and in such connection it relates to the construction and arrangement of such a clutch mechanism.

The principal object of my present invention is to provide a simple and efficient clutch mechanism for employment in cigarette and other machines.

The nature and scope of my present invention will be more fully understood from the following description, taken in connection with the accompanying drawings, forming part hereof, in which—

Figure 1:
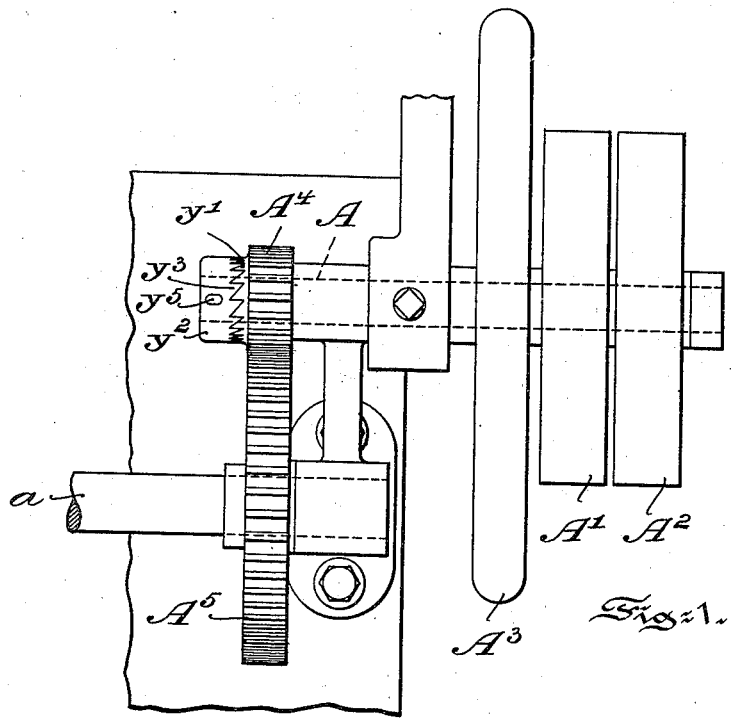
Figure 2:
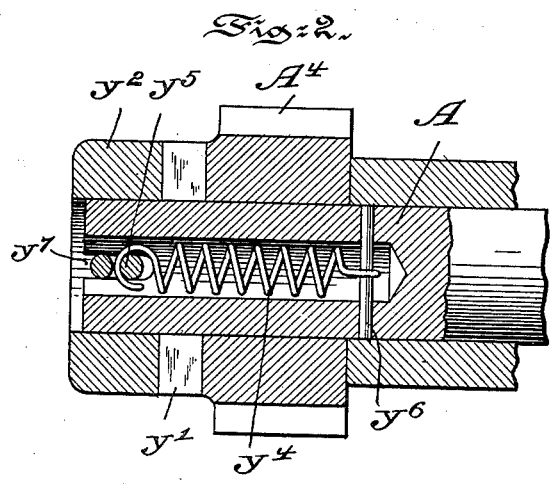
Figure 3:
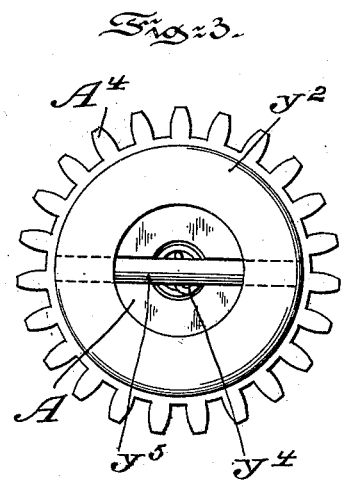

Figure 1 is a top or plan view of a portion of a cigarette or other machine with a clutch mechanism connected therewith embodying main features of my said invention. Fig. 2 is an enlarged sectional view of the end of a positively-driven shaft and a gear-wheel and sleeve mounted thereon and illustrating a spring tending to hold the teeth of said sleeve and gear-wheel in engagement with each other, and Fig. 3 is an end elevational view of the positively-driven shaft and illustrating the sleeve and gear-wheel in side elevation.

Referring to the drawings, A represents a shaft on which are located fast and loose pulleys $A'$ and $A^2$ and a fly-wheel $A^3$. The shaft A is positively driven by the fast pulley $A'$ and a belt (not shown) from any suitable source of power. The motion of the positively-driven shaft A in one direction is transmitted to a second shaft $a$ by means of gear-wheels $A^4$ and $A^5$, upon which all of the means for operating the various mechanisms of a cigarette or other machine (not shown) are adapted to be located. In order to prevent the transmission of retrograde movement of the shaft A to the shaft $a$, the gear-wheel $A^4$ is mounted loosely on the shaft A and is provided with lateral projecting teeth $y'$, engaging the teeth $y^3$ of a sleeve $y^2$, which is fixed to the shaft A, yet slidable thereon. As shown in Fig. 2, within the shaft A is arranged a spring $y^4$, which is connected to a bolt $y^5$ of the sleeve $y^2$, passing through a slot $y^7$ of the shaft A, at one end and at the other end to a bolt $y^6$, arranged in the shaft A, the spring $y^4$ normally tending to hold the sleeve $y^2$ with its teeth $y^3$ in engagement with the teeth $y'$ of the gear-wheel $A^4$. As long as a movement in the proper direction is imparted to the shaft A this movement by the gear-wheel $A^4$ will be transmitted to the gear-wheel $A^5$ and shaft $a$. If, however, the shaft A is turned backward, the teeth $y^3$ of the sleeve $y^2$ will slide over the teeth $y'$ of the gear-wheel $A^4$, and the wheel $A^4$ will in this manner be disengaged from the sleeve $y^2$ and the machine brought to a standstill, as in this instance motion is not transmitted from the positively-driven shaft A to the shaft $a$.

Having thus described the nature and objects of my invention, what I claim as new, and desire to secure by Letters Patent, is—

In a clutch mechanism, a driven shaft provided with an internal chamber and slot, a pin or bolt extending through said shaft, a ratcheted sleeve mounted on said shaft, a pin or bolt arranged in said sleeve and passing through the slot of said shaft, a ratcheted gear-wheel loosely mounted on said shaft, and a spring mounted in the chamber of said shaft, the respective ends of which are connected with the pins of said shaft and sleeve, substantially as and for the purposes described.

In testimony whereof I have hereunto set my signature in the presence of two subscribing witnesses.

GUIDO FERRARI.

Witnesses:
J. WALTER DOUGLASS,
THOMAS M. SMITH.